United States Patent

Clark et al.

[11] Patent Number: 5,978,114
[45] Date of Patent: Nov. 2, 1999

[54] MODULAR CASCADED MACH-ZEHNDER DWDM COMPONENTS

[75] Inventors: Timothy Edward Clark, Lisle, Ill.; Donald W. Duda, Williams Bay, Wis.

[73] Assignee: Amphenol Corporation, Wallingford, Conn.

[21] Appl. No.: 08/921,330

[22] Filed: Aug. 29, 1997

[51] Int. Cl.[6] .................................................. H04J 14/00
[52] U.S. Cl. ............................ 359/115; 359/127; 385/24
[58] Field of Search ................................... 359/115, 117, 359/127, 128, 130, 173; 385/24

[56] References Cited

U.S. PATENT DOCUMENTS

| | | |
|---|---|---|
| 4,798,436 | 1/1989 | Mortimore . |
| 4,945,531 | 7/1990 | Suzuki . |
| 5,044,715 | 9/1991 | Kawachi et al. . |
| 5,048,909 | 9/1991 | Henry et al. . |
| 5,218,419 | 6/1993 | Lipson et al. ............................ 385/24 |
| 5,283,686 | 2/1994 | Huber . |
| 5,295,205 | 3/1994 | Miller et al. . |
| 5,309,534 | 5/1994 | Cohen et al. . |
| 5,351,325 | 9/1994 | Miller et al. . |
| 5,440,415 | 8/1995 | Mekawi et al. ......................... 359/126 |
| 5,448,390 | 9/1995 | Tsuchiya et al. . |
| 5,488,500 | 1/1996 | Glance . |
| 5,521,733 | 5/1996 | Akiyama et al. . |
| 5,555,118 | 9/1996 | Huber . |
| 5,557,439 | 9/1996 | Alexander et al. . |
| 5,596,667 | 1/1997 | Watanabe . |
| 5,600,468 | 2/1997 | Barber . |
| 5,608,571 | 3/1997 | Epworth et al. . |
| 5,608,825 | 3/1997 | Ip . |

OTHER PUBLICATIONS

Jay S. Van Delden, "Optical Circulators Improve Bidirectional Fiber Systems", *Laser Focus World*, Nov. 1995, pp. 109–112.

*Primary Examiner*—Rafael Bacares
*Attorney, Agent, or Firm*—Bacon & Thomas, PLLC

[57] ABSTRACT

A multiple channel fiber optic multiplexer, demultiplexer, multiplexer/demultiplexer, and/or add/drop component includes a plurality of Mach-Zehnder interferometer units, each unit including a pair of 50/50 fiber optic couplers connected by a pair of Bragg gratings and three functional ports including two multi-channel input output ports, one single channel input/output port, the Bragg gratings being tuned to a wavelength of the single channel input/output port, and input/output ports of adjacent interferometer units being connected to each other by fusion splices in a cascade configuration, the component including a first common input/output connector on a first of said cascaded interferometer units and a second common input/output connector on a last of said cascaded interferometer units, with the second common input/output connector being arranged to permit the addition of add-on multi-channel components. The cascaded components, which can be uni-directional or bi-directional, can be connected to each other as serial add-on units, or in the case of modular uni-directional components, be used to upgrade existing NWDM systems to DWDM systems having a greater number of channels by utilizing the existing NWDM components as combiners to connect the cascaded uni-directional components in parallel.

30 Claims, 9 Drawing Sheets

MODULAR CASCADED MACH-ZEHNDER DWDM COMPONENTS

BACKGROUND OF THE INVENTION

1. Field of the Invention

This invention relates to modular multiple channel fiber optic multiplexer, demultiplexer, multiplexer/demultiplexer, and/or add/drop components which employ Mach-Zehnder optical interferometers, and which may be used in dense wavelength division multiplexing (DWDM) communications systems or networks having channel spacings of less than one nanometer.

2. Discussion of Related Art

Fiber optic systems are presently being used for high bandwidth, high speed voice and video communications. Originally, single channel systems in which each fiber carried a single channel sufficed, but increases in traffic have led to a need for greater channel-carrying capacity. Because of the high cost of laying optical fibers, increasing capacity by laying more fibers is impractical, and thus achieving greater efficiency in utilizing fiber resources has become increasingly important, which has led to the development of systems for adding channels to existing fibers, and ultimately to the development of systems for providing two-way multiple channel communications over a single fiber.

In fiber optic systems, the most convenient way to carry multiple channels over a single fiber without interference between the channels, for both one-way and bi-directional communications, is by means of a technique known as wavelength division multiplexing, in which multiple signals of separate wavelengths are coupled to the fiber at the transmitting side and separated at the receiving side. Introduction of the different wavelengths into the fiber at the transmitting end and their removal at the receiving end can be accomplished in a number of different ways, including electronic multiplexing before conversion to a light signal, and by means of simple fused fiber couplers. Optical coupling is preferable to electronic multiplexing techniques because of its speed and simplicity, but maintaining adequate channel separation, rejecting noise, and minimizing losses are difficult to achieve with conventional optical couplers.

In order to improve channel separation and reduce noise and losses in the optical couplers used to combine or separate wavelengths for optical wavelength division multiplexer systems, and in particular dense wavelength division multiplexing systems, which are defined as systems having a wavelength or channel spacing of less than eight nanometers, it has recently been proposed to use a type of fiber optic coupler made up of a Mach-Zehnder interferometric filter to which Bragg gratings have been added, for the purpose of inserting or removing channels from a wavelength division multiplexed light signal. The Mach-Zehnder interferometric coupler is relatively simple in structure and yet provides greatly improved isolation of channels with relatively low loss in comparison with conventional fiber optic channel adding or removing couplers.

Figure 1:
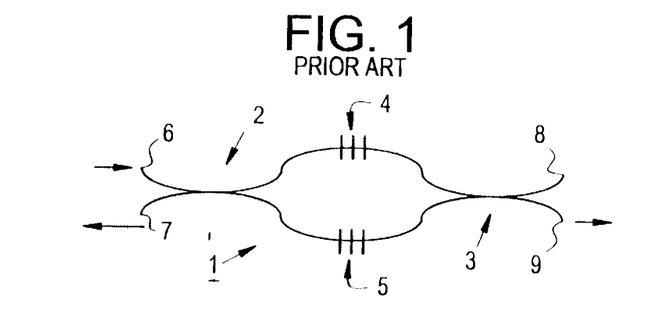
FIG. 1 is a schematic diagram of an individual wavelength division demultiplexer filter unit used in the preferred embodiment of the invention.

FIG. 1 shows a Mach-Zehnder interferometer 1 of the type which may be used in the claimed invention. A more detailed description of this type of interferometer may be found in U.S. Pat. No. 4,900,119, the disclosure of which is hereby incorporated by reference. The Mach-Zehnder interferometer 1 shown in FIG. 1 consists of two 50/50 fiber optic couplers 2 and 3 connected by two identical Bragg gratings 4 and 5. The first coupler has two ports 6 and 7, and the second coupler includes two ports 8 and 9, ports 6–9 being in the form of fiber ends which can be connected by splicing or any other convenient means to a signal source or receiver, or to other fibers.

When used for the purpose of removing a channel from a wavelength division multiplexed signal, the first port, port 6, serves as the input for the multiplexed signal from which the channel is to be removed, the input signal being equally split by the 50/50 coupler 2 and transmitted to the two identical Bragg gratings 4 and 5 which are arranged to reflect only the channel (or channels) to be removed, and to pass all other channels with minimal loss. The reflected channel or wavelength is then combined by the first 50/50 coupler 2 and output through the second port, port 7, while the channels which pass through the Bragg filters are combined by the second 50/50 coupler 3 and output through the fourth port, port 9. The third port, port 8, is terminated by conventional means and is generally not used, although it is possible to use port 8 to add back a signal at the same wavelength as the signal originally reflected by the Bragg grating and output through port 7.

When Mach-Zehnder interferometer 1 is used for the purpose of inserting a wavelength into a wavelength division multiplexed signal, the fourth port (port 9) is used as the input for the signal to which a channel is to be added, and the second port (port 7) is connected to the channel source, with Bragg gratings 4 and 5 again being arranged to reflect the channel being inserted and to pass other channels. In this case, 50/50 coupler 3 separates the signal input through port 9 into two equal parts which pass through filters 4 and 5 and are combined by 50/50 coupler 2 for output through port 6. The inserted channel is separated into two parts by 50/50 coupler 2, reflected by filters 4 and 5, and then re-combined in 50/50 coupler 2 for output through the first port (port 6) along with the signal originally input through port 9.

Figure 2:
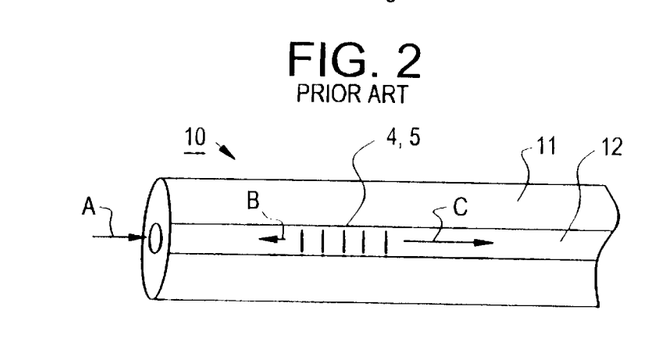
FIG. 2 is a side view of an in-fiber Bragg grating used in the filter unit of FIG. 1.

The Bragg gratings 4 and 5 used in the Mach-Zehnder interferometer 1 of FIG. 1 are illustrated in greater detail in FIG. 2, which shows an optical fiber 10 having a cladding 11 and core 12 within which the Bragg gratings are formed by irradiating germanium oxide ($GeO_2$) sites in the core with interfering ultra-violet light beams, thereby creating permanent changes in the core in the form of repetitive refractive index changes which act as a physical grating. When light travelling down the core of the fiber, indicated by arrow A, encounters the grating, a portion of the light indicated by arrow B is reflected back and the remainder indicated by arrow C is passed with little loss.

Figure 3A:
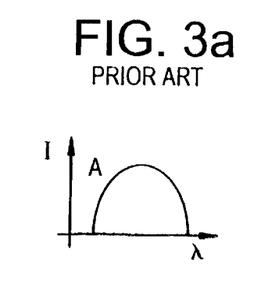
FIGS. 3a–3c are diagrams showing an idealized input signal, reflected signal, and output signal for the Bragg filter of FIG. 2.
Figure 3B:
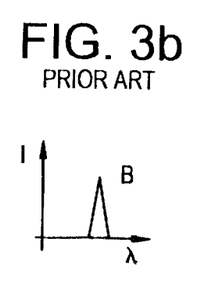
Figure 3C:
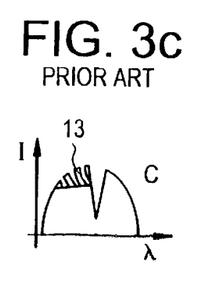

FIGS. 3a–3c are idealized schematic representations of spectral plots respectively showing the incident light indicated by arrow A, the reflected light indicated by arrow B, and the light output indicated by arrow C for the Bragg grating arrangement of FIG. 2. A key feature of the spectrum shown in FIG. 3c is that a portion of the spectrum, on the short wavelength side of the notch formed by the Bragg grating is missing. The missing portion 13 is known as the short wavelength tail and represents losses in the Bragg grating. While losses also occur at higher wavelengths, the losses are markedly asymmetric and only the short wavelength losses have been depicted in FIG. 3c.

Mach-Zehnder interferometers of the type depicted in FIG. 1, utilizing the in-fiber Bragg gratings of FIG. 2, are now commercially available and form the basis for the fiber optic multiplexer/demultiplexer system of the present invention. However, although it has previously been proposed to use such interferometers for the purpose of inserting or removing channels in a wavelength division multiplexing system, the proposals have only generally indicated how the integration of the Mach-Zehnder interferometers into a practical fiber optic communication system are to be accomplished. In particular, while one way to integrate the interferometers would simply be to connectorize the three functional ports of the interferometer so that one interferometer and signal source and receiver could easily be connected to the main signal as needed, the use of connectors increases the overall signal losses in the device. On the other hand, fusion splicing of the interferometer ports would minimize losses but make component replacement and upgrading of the system impractical. In addition, any solution designed to minimize losses must address the short wavelength tail effect.

Thus, while Mach-Zehnder interferometer technology is ideally suited to the overall purpose of adding or removing channels in a wave-division multiplexing system, the use of wavelength division multiplexing permitting multiple channel uni-directional or bi-directional communications over single fibers without the need for laying additional fibers, a practical arrangement for incorporating the interferometers in a communication system with minimum signal loss, in which interferometers can easily be removed or added in the field for replacement or upgrading, and in which the interferometers can be retrofitted onto existing narrowband systems in order to increase the number of channels without having to replace existing components, has yet to be proposed. The present invention seeks to provide such a system.

It is noted that neither modularity or minimization of signal losses are new concepts. For example, a modular fiber optic wavelength division multiplexer/demultiplexer arrangement is disclosed in U.S. Pat. No. 5,557,439. However, this patent takes the approach of separately packaging each of the channel insertion or separation devices, and simply providing spare packages in the combined component in case the number of channels needs to be increased. Such an approach requires, in addition to the channel adding or removing packages or modules, a mixer on the multiplexer side and a splitter on the demultiplexer side for distributing the multiplexed signal to the individual channel separators and combining the outputs of the individual channel inserters, and while such an arrangement has the advantage of a purely parallel configuration in which each channel only passes through a single separator or inserter during multiplexing and demultiplexing, it is wasteful of resources. In contrast, the present invention uses a cascaded arrangement, in which the channel inserting or removing components are placed in series, eliminating the need for splitters, mixers, and multiple fiber connections, but amplifying the problem of signal losses.

Thus, a need still exists for a fiber optic multiplexer and demultiplexer components for use in multiple channel wavelength division multiplexing systems, having both acceptable signal losses and a high degree of modularity.

SUMMARY OF THE INVENTION

It is accordingly an objective of this invention to provide a wavelength division multiplexer/demultiplexer system which provides a high degree of modularity with minimal signal loss, and in particular one in which the number of channels can easily be varied on-site.

It is a further objective of the invention to provide a wavelength division multiplexer/demultiplexer system utilizing cascaded Mach-Zehnder interferometers arranged as modular multiple channel multiplexer, demultiplexer, or bi-directional multiplexer/demultiplexer components, and in which channels can be added by simply connecting together two such components via a connectorized fiber optic patch cord.

It is a still further objective of the invention to provide a wavelength division multiplexer/demultiplexer system utilizing cascaded Mach-Zehnder interferometers in which losses due to the short wavelength tail effect are minimized.

Finally, it also an objective of the invention to provide a wavelength division multiplexer/demultiplexer system utilizing cascaded Mach-Zehnder interferometers, which can be retrofitted onto an existing narrowband wavelength division multiplexing (NWDM) system in order to convert the system into a dense wavelength division multiplexing (DWDM) system having an increased number of channels, without the need for extensive replacement of existing components, and in which losses are maintained at acceptable levels.

These objectives are achieved by providing a wavelength division multiplexer made up of a plurality of individual Mach-Zehnder interferometric filter units, each having four ports, in which fiber optic connectors are provided on the first port of the first filter unit, the second port of each of the filter units, and the fourth port of the last filter unit, and adjacent fourth and first ports of the individual filter units are fusion spliced to minimize connection losses within the component.

In one preferred arrangement, a demultiplexer constructed according to the principles of the invention includes one filter unit for each channel to be separated, while the multiplexer includes one less filter unit than the number of channels to be added, thereby reducing the number of filter units (by 25% for a four channel demultiplexer), while still providing expansion capabilities. The multiplexer and demultiplexer can be combined into a single bi-directional component, either by fusion splicing the fourth port on the last Mach-Zehnder interferometer in the demultiplexer with the first port on the first Mach-Zehnder interferometer of the multiplexer, or by fusion splicing the first port on the first Mach-Zehnder interferometer of the demultiplexer with the fourth port on the last Mach-Zehnder interferometer of the multiplexer.

This highly modular arrangement can advantageously be retrofitted onto existing narrowband systems simply by connecting the output ports of one or more uni-directional multiplexers constructed in the manner described above and/or the input ports of one or more uni-directional demultiplexers to the existing narrowband ports.

It will be appreciated that references made herein to the "first," "second," and "fourth" ports of the respective interferometers of the preferred components are intended to refer to ports 6, 7, and 9 of the Mach-Zehnder interferometer shown in FIG. 1, and that these ports are in practice simply the ends of the fibers which make up the respective 50/50 couplers 2 and 3. In addition, it is noted that whenever an "order" of units is referred to herein, the order is in the direction of travel or propagation of the multiplexed light signal, from the first port (port 6 in FIG. 1) to the fourth port (port 9) in the case of a demultiplexer, and from the fourth port (port 9) to the first port (port 6) in the case of a multiplexer.

Those skilled in the art know that the effect of the short wavelength tail can easily be eliminated in the preferred components by simply arranging the Mach-Zehnder interferometers or filter units in order of increasing wavelengths. This avoids having the short wavelength edge of a signal pass through the Bragg gratings for the lower wavelength signals, thereby reducing overall multiplexing losses and demultiplexing losses.

Finally, it is noted that the invention permits further decreases in overall losses to be obtained by adding filters or other devices as desired between the Mach-Zehnder interferometers and the various inputs and/or outputs of the component. For example, in the illustrated embodiment, Bragg filters, which may be of the type shown in FIG. 2, are added between the output ports of the demultiplexer Mach-Zehnder interferometers and the output connectors to which the output ports are connected.

DETAILED DESCRIPTION OF THE PREFERRED EMBODIMENTS

Figure 4:
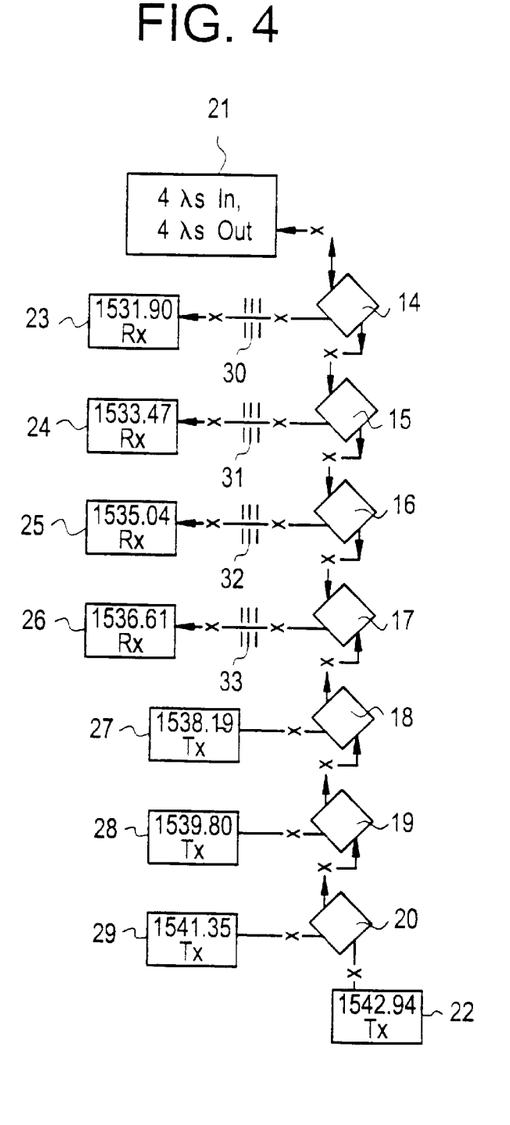
FIG. 4 is a schematic diagram of an eight channel bi-directional multiplexer/demultiplexer assembly constructed according to the principles of a preferred embodiment of the invention.

As shown in FIG. 4, an eight channel bi-directional multiplexer/demultiplexer assembly or component constructed according to the principles of a preferred embodiment of the invention includes seven individual Mach-Zehnder interferometric units 14–20, symbolized by diamonds, which are arranged in a series or cascaded configuration. The filter units are of the type illustrated in FIG. 1, with the overall component having a common bi-directional input/output 21, a common add-on input/output 22, four single channel outputs 23–26, and three single channel inputs 27–29.

Each of the common input/outputs 21,22 and single channel inputs and outputs 23–26,27–29 is preferably in the form of a fiber optic connector such as an FC connector to which connectors attached to the respective signal lines, receivers, transmitters or other components for supplying or receiving the separate channels can easily be mated. Such connectors are well-known and a variety of commercially available versions could be used. In addition, the mutual connections between the individual Mach-Zehnder interferometers, and the connections to the input/output connectors are preferably provided by fusion splices, indicated by x's in the drawings.

Each of the Mach-Zehnder interferometers 14–20 in the illustrated example is arranged to drop or add a single channel, although it is also possible to arrange the Bragg gratings in an individual interferometer to drop or add a group of adjacent closely-spaced channels for use as combiners or splitters in a modified cascade arrangement. The wavelengths of the channels in this arrangement are of course exemplary in nature, and not intended to be limiting, although it is of course necessary to provide channels compatible with existing fiber optic communication systems. The commercially available Mach-Zehnder interferometers can be manufactured to have any of the illustrated wavelength by varying the interference pattern used to create the Bragg gratings, a process which is referred to herein as tuning the filters.

In the example shown in FIG. 4, Mach-Zehnder interferometer or filter unit 14 includes a Bragg grating which reflects a range of frequencies centered at 1531.90 nm, filter unit 15 is tuned to 1533.47 nm, filter unit 16 is tuned to 1535.04 nm, and filter unit 17 is tuned to 1536.61 nm. The filter units 18–20 are tuned respectively to 1538.19 nm, 1539.80 nm, and 1541.35 nm. This particular order of wavelengths is preferred because it eliminates the short wavelength tail effect, which would otherwise result in higher accumulated losses for the shorter wavelengths and an increase in the overall loss budget for the component.

In an especially advantageous feature of this embodiment of the invention, the last single wavelength input to the multiplexer portion of the component, which is at 1542.94 nm, does not require its own Mach-Zehnder interferometer but rather is provided by the common add-on input/output 22, which is connected to the fourth port of the interferometer 20 tuned to 1541.35 nm, thus decreasing the number of Mach-Zehnder interferometers required to implement the illustrated component. Instead of providing a dedicated input, in the situation where the component is used as the sole multiplexer/demultiplexer, with no channels to be added, the signal source for the last wavelength may be connected directly to the fourth port of the last Mach-Zehnder interferometer (port 9 in FIG. 1), with the second-to-last wavelength being input through the second port (port 7 in FIG. 1), while in the situation where additional channels are required, the signal source for the last channel may be provided by an add-on component of the type shown in FIGS. 6 and 7. Of course, when the add-on component is required, the number of Mach-Zehnder interferometers will equal the number of channels, but the basic component cost can nevertheless be significantly reduced by this arrangement. In addition, the loss budget for the component illustrated in FIG. 4 is also reduced due to the corresponding decrease in the number of filters which must be traversed by the last channel.

In operation, the four input wavelengths 1531.90 nm, 1533.47 nm, 1535.04 nm, and 1536.61 nm are input through common input/output connector 21 of the bi-directional assembly illustrated in FIG. 4, and the latter three wavelengths pass through the Bragg gratings of Mach-Zehnder interferometer 14 (gratings 4 and 5 shown in FIG. 1), while the 1531.90 nm wavelength is reflected back by the Bragg gratings and output through connector 23 to a suitable receiving device. The longest two of the three remaining wavelengths then pass through the Bragg gratings of Mach-Zehnder interferometer 15, while the 1533.47 nm wavelength is reflected back and output through connector 24, with the longest remaining wavelength passing through the Bragg gratings of Mach-Zehnder interferometer 16, and the 1535.04 wavelength being reflected back to be output through connector 25. The last input wavelength of 1536.61 is then reflected back by the Bragg gratings of Mach-Zehnder interferometer 17 and output through connector 26. The four input wavelengths, on the other hand, are input through connectors 27–29 and common input/output connector 22 and reflected by the respective Bragg gratings of Mach-Zehnder interferometers 18–20 to pass through the lower wavelength Mach-Zehnder interferometer, including Mach-Zehnder interferometers 14–17, to be output through common input/output connector 21.

In order to improve isolation of the receivers and directivity of the module, the embodiment illustrated in FIG. 4 also includes additional Bragg filters 30–33, which may be spliced between ports 7 of the individual filters and the output connectors to which the receivers are connected. This is less necessary on the transmitter side since signals are being added rather than subtracted.

Finally, with respect to the assembly or component of FIG. 4, it will be appreciated by those skilled in the art that the demultiplexer and multiplexer portions of the illustrated bi-directional component could be packaged as separate components by replacing the fusion splice between Mach-Zehnder interferometers 17 and 18 with separate input/output connectors, as will be discussed below in connection with FIGS. 10–14. This would not change the principles of operation or construction of either the multiplexer or the demultiplexer.

Figure 5:
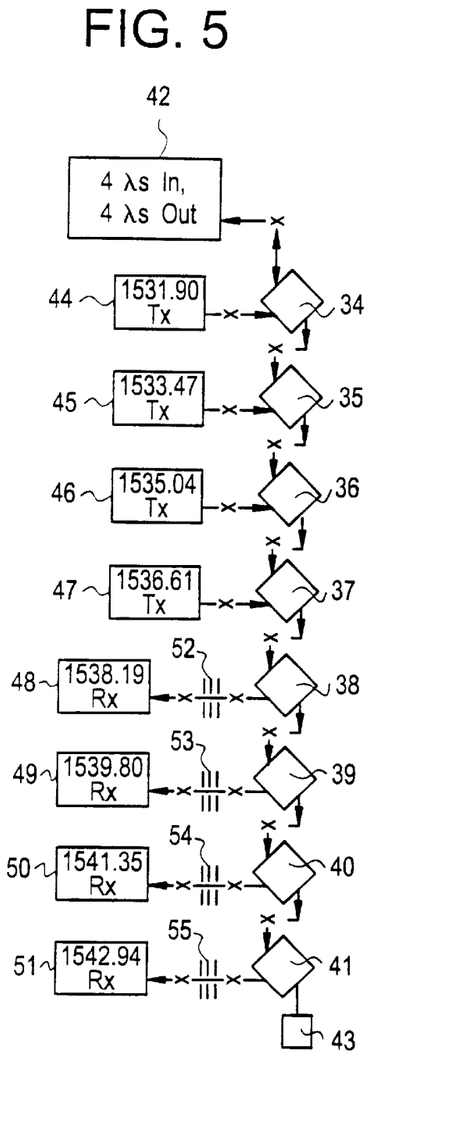
FIG. 5 is a schematic diagram of an eight channel bi-directional demultiplexer/multiplexer assembly complementary to the multiplexer/demultiplexer of FIG. 4.

The bi-directional eight channel multiplexer and demultiplexer component shown in FIG. 5 is constructed in the same manner as the component shown in FIG. 4, except that the order of transmitters and receivers is reversed, and four rather than three transmitter units are provided. The channel insertion Mach-Zehnder interferometers in this embodiment are numbered 34–37 while the channel dropping interferometers are numbered 38–41, the input/output connectors are 42 and 43, the transmitter input connectors are 44–47, the receiver output connectors are 48–51, with the Bragg gratings connected between the receiver connectors and the corresponding interferometers being numbered as 52–55. Operation of this bi-directional assembly is similar to that of the bi-directional assembly of FIG. 5 and will be apparent to those skilled in the art without the need for further description.

The alternative arrangement of FIG. 5 requires an extra Mach-Zehnder interferometer because of the placement of the transmitter section before the receiver section in order to maintain the order of increasing/decreasing wavelengths used to eliminate short wavelength tail losses. On the other hand, in a uni-directional eight channel multiplexer arrangement such as the one described below in connection with FIGS. 12–13, while there would always be eight Mach-Zehnder interferometers in the demultiplexer, there could be either seven or eight Mach-Zehnder couplers in the demultiplexer.

Figures 6, 7:
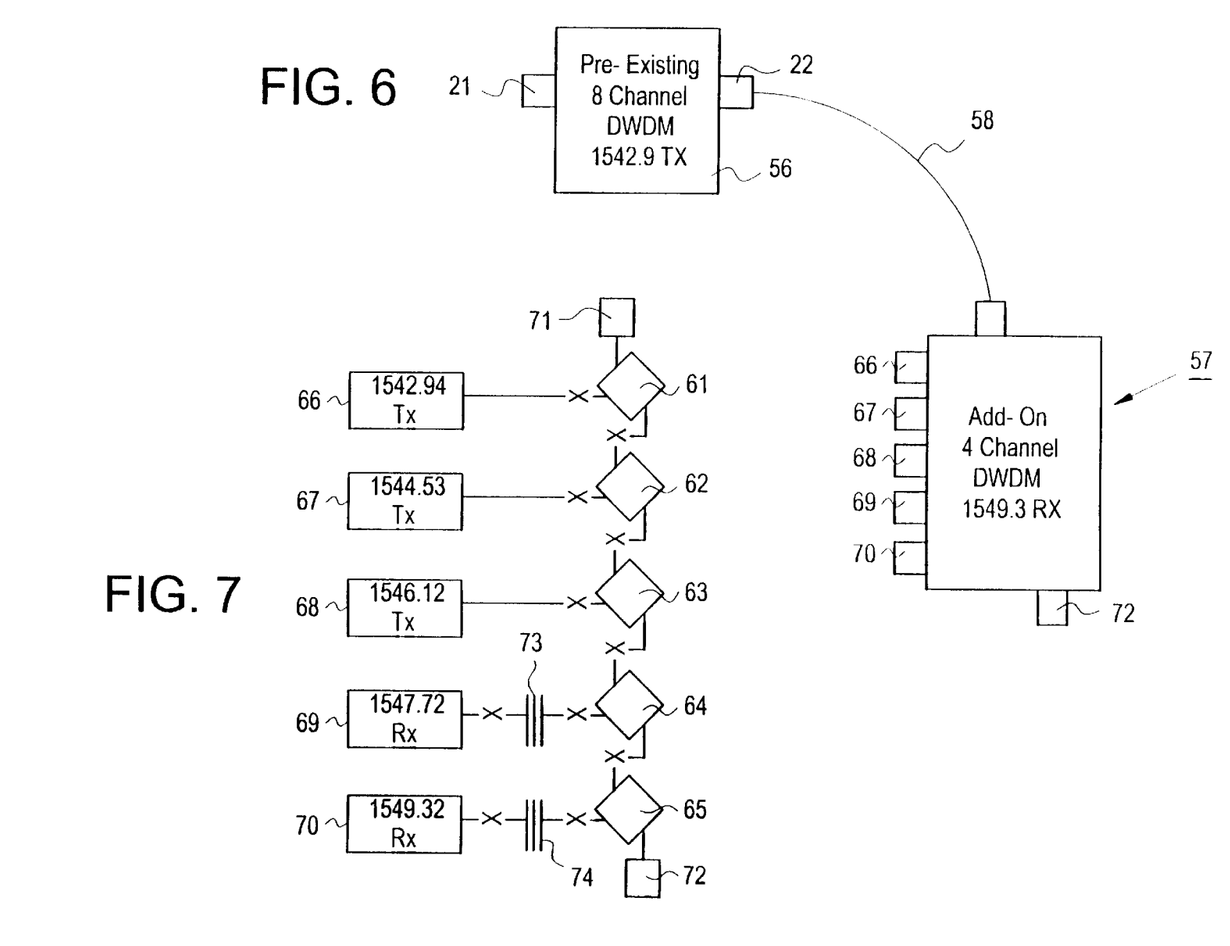
FIG. 6 is a plan view showing the assembly of FIG. 4, with an add-on four channel unit.
FIG. 7 is a schematic diagram showing details of the four channel unit of FIG. 6.
Figures 8, 9:
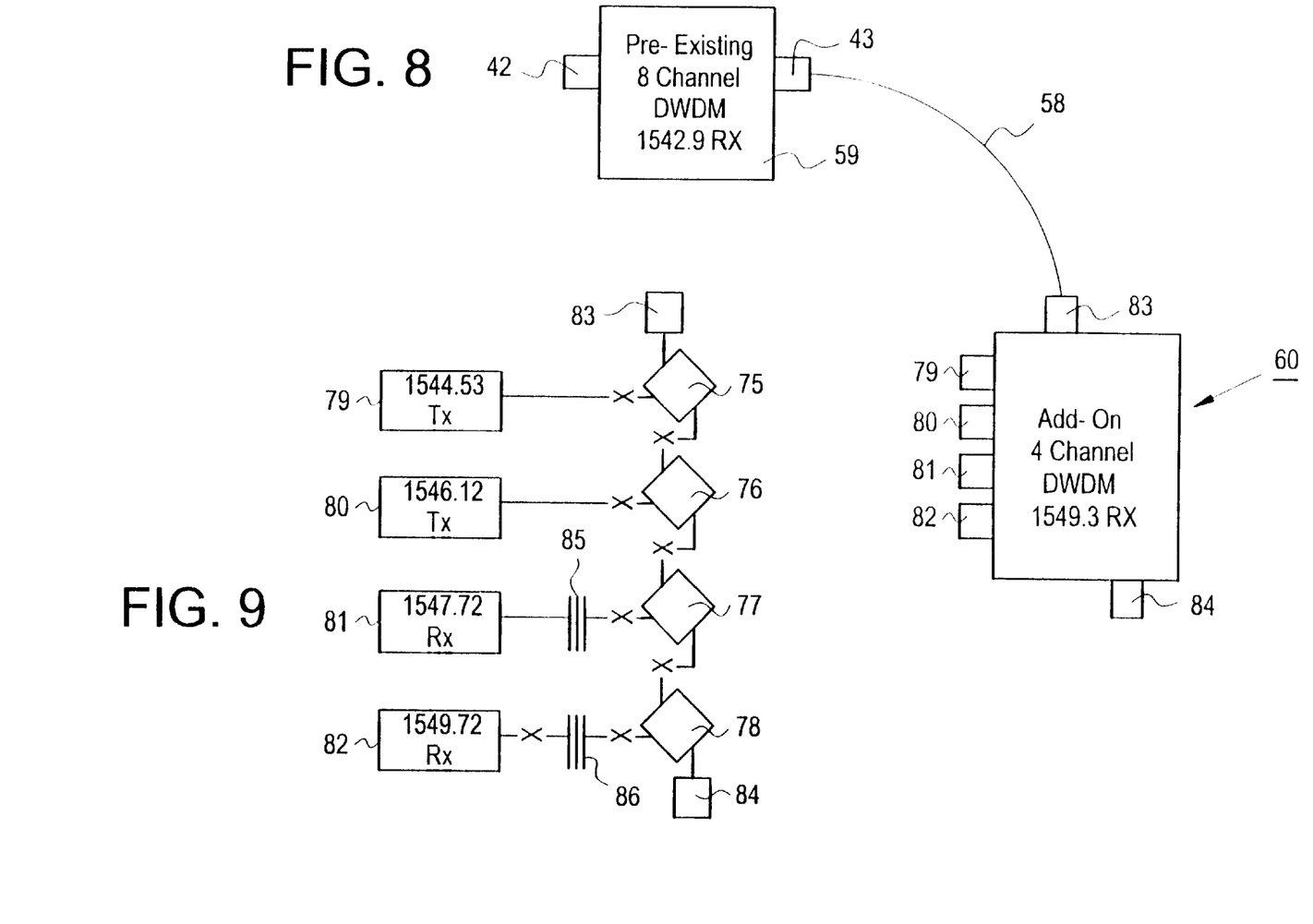
FIG. 8 is a plan view showing the assembly of FIG. 5, with an add-on four channel unit.
FIG. 9 is a plan view showing details of the four channel add-on unit of FIG. 8.

As illustrated in FIGS. 6 and 8, the respective bi-directional eight channel multiplexer/demultiplexer assemblies of FIGS. 4 and 5 are each contained in a respective housing 56 and 59 (not drawn to scale) which can be used with or without add-on units 57 and 60 connected thereto by connectorized patch cords 58. The add-on units 57 and 60 are illustrated as being in the form of four channel units, although those skilled in the art will appreciate that the add-on units could be arranged to carry any desired number of channels, as could the base component contained within housings 56 and 59.

For the four channel add-on component 57 corresponding to the eight channel base component illustrated in FIG. 4, five rather than four individual Mach-Zehnder filter units 61–65 are required, for the reasons explained above, with the individual units corresponding to input ports 66–68 illustrated in FIG. 7 being respectively tuned to 1542.94 nm, 1544.53 nm, and 1546.12 nm for the three transmitters. The 1542.94 wavelength is the same as the one which would be inserted directly through the common input/output 22 of the base component 56 in the absence of an add-on component, while the two Mach-Zehnder filter units 64 and 65 for the receiver ports 69 and 70 are tuned to 1547.72 nm and 1549.32 nm, respectively.

In this arrangement, the input/output connector which is connected to the base component is designated by reference numeral 71, while an optional additional input/output connector 72 may be added to the fourth port of the last Mach-Zehnder filter unit 65 in order to provide for the addition of further add-on components. In addition, it will be noted that the order of increasing or decreasing wavelengths for the purpose of eliminating the effects of the short wavelength tail is maintained in this component, as is the use of additional Bragg filters 73 and 74 for the receiver connectors. Operation of the add-on component shown in FIG. 7, as well as that of FIG. 9 and the multiplexers, demultiplexers, and add/on component illustrated in FIGS. 10–14 is similar to that explained in detail above in connection with the assembly of FIG. 4 and will be readily understood by those skilled in the art.

For the four channel add-on component 60 shown in detail in FIG. 9 and corresponding to the eight channel component illustrated in FIG. 5, only four individual Mach-Zehnder filter units 75–78 are required, but this add-on component is otherwise identical in construction to the one shown in FIG. 7, including input connectors 79 and 80, output connectors 81 and 82, main input/output connector 83, optional add-on input/output connector 84, and additional Bragg filters 85 and 86. Mach-Zehnder filter units 75–78 are, like those of the component shown in FIG. 7, respectively tuned to 1544.53 nm and 1546.12 nm for the channel adding units, and 1547.72 nm and 1549.32 nm for the channel dropping units.

Currently, individual Mach-Zehnder interferometers or filter units of the type shown in FIG. 1 have a passband of 0.5 nm to 0.8 nm with an isolation between adjacent channels of greater than 25 dB for the illustrated channel spacing of approximately 1.6 nm and a total polarization dependent loss (PDL) of ≦0.1 to 0.2 dB. Including losses at the fusion splices, this results in a maximum insertion loss of 3.0 dB for the unit shown in FIG. 4 and a maximum insertion loss of 3.4 dB for the unit shown in FIG. 5, with a typical PDL of 0.1 dB, a maximum PDL of 0.2 dB, a polarization mode dispersion (PMD) of less than 0.10 psec, and the above-mentioned greater than 25 dB channel isolation. These loss figures are well within typical loss budgets allocated to the multiplexer/demultiplexer components of current fiber optic communication systems, and represent significant improvements over other types of comparably functional systems.

Although it is believed that based on the description given above, those skilled in the art can use the principles of the invention to form either bi-directional or uni-directional components, including multiplexers, demultiplexers, and multiplexer/demultiplexer units, several additional configurations, which are not to be taken as limiting in any way, are shown in FIGS. 10–14. In these figures, neither the fusion splices nor the Bragg gratings shown in FIGS. 4, 5, 7, and 9 are shown, but it will be appreciated by those skilled in the art that such elements, and/or additional filter elements, Michelson interferometers, and the like, could easily be added to the illustrated elements in order to provide increased isolation or directivity, and that all such modifications are to be included within the scope of the invention.

Figure 10:
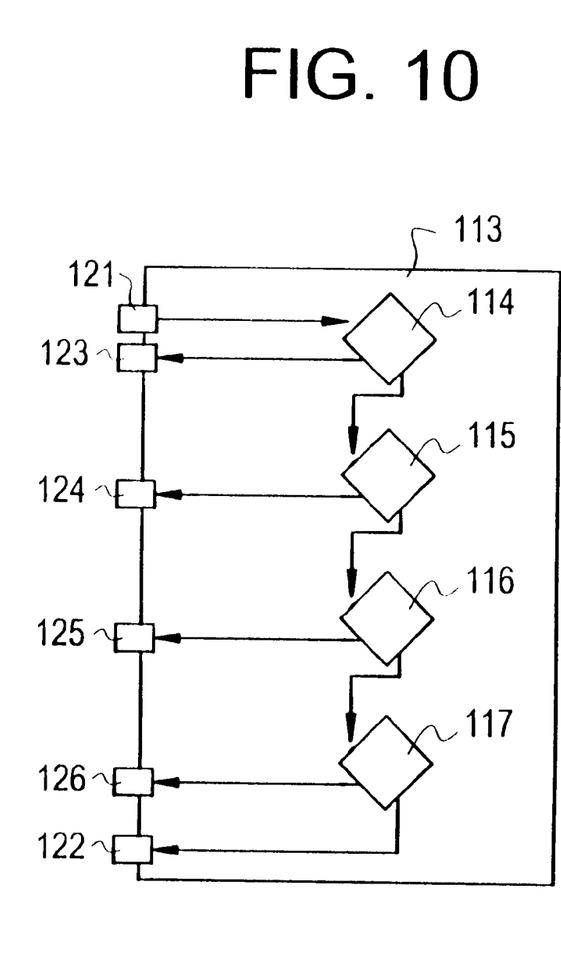
FIG. 10 is a schematic diagram of a four channel wavelength division demultiplexer assembly constructed in accordance with the principles of the preferred embodiment of the invention.
Figure 11:
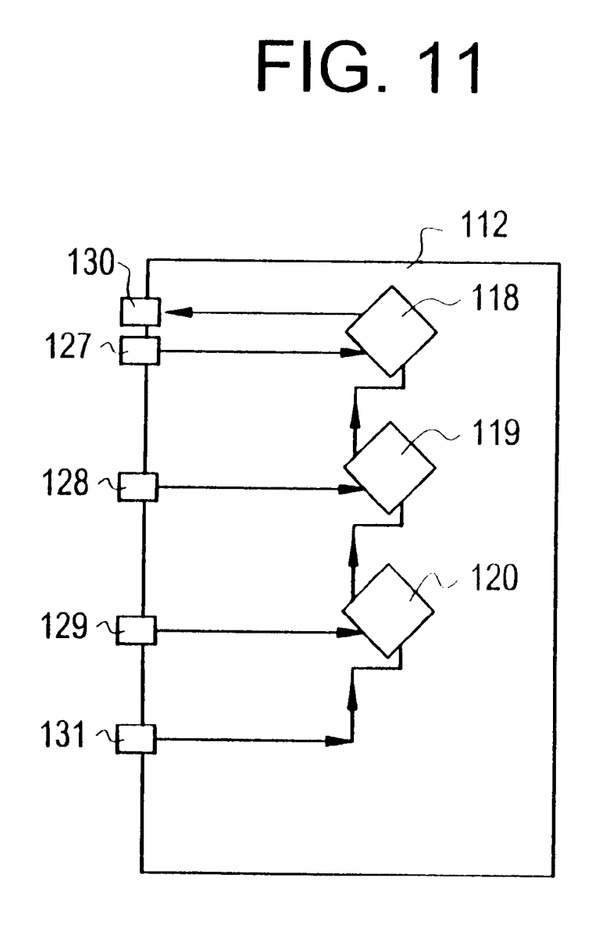
FIG. 11 is a schematic diagram of a four channel wavelength division multiplexer assembly constructed in accordance with the principles of the preferred embodiment.

The four channel uni-directional demultiplexer and multiplexer shown in FIGS. 10 and 11, for example, is (as discussed above) similar in arrangement to the demultiplexer and multiplexer sections of the bi-directional component illustrated in FIG. 4, with the exception that the last port of the demultiplexer is not fusion spliced to the first port of the multiplexer, the respective ports instead being connectorized to form separate uni-directional components.

More specifically, the four channel uni-directional demultiplexer 113 shown in FIG. 10 includes four individual Mach-Zehnder interferometric units 114–117, symbolized by diamonds, which are arranged in a series or cascaded configuration, and which are preferably connected together by fusion splices (not shown) or similar low loss connections. The filter units are of the type illustrated in FIG. 1, with the overall component having a common uni-directional input 121, a common add-on output 122, and four single channel outputs 123–126. The common input 121, common output 122, and each of the single channel inputs 123–126 are, as in the embodiment of FIG. 4, preferably in the form of fiber optic connectors such as FC connectors to which connectors attached to the respective signal lines, receivers, or other components for supplying or receiving the separate channels, can easily be mated. In addition, as in the embodiment of FIG. 4, each of the Mach-Zehnder interferometers 114–117 in the illustrated example is arranged to drop a single channel, although it is again also possible to arrange the Bragg gratings in an individual interferometer to drop a group of adjacent closely-spaced channels for use as combiners or splitters in a modified cascade arrangement.

Turning to FIG. 11, the four channel uni-directional multiplexer 112 illustrated therein is constructed in a manner similar to the multiplexer section of the bi-directional component of FIG. 4, including three individual Mach-Zehnder interferometric units 118–120 arranged in a series or cascaded configuration and preferably connected by fusion splices or similar low loss connections. The filter units are again of the type illustrated in FIG. 1, with the overall component having a common uni-directional output 130, a common add-on input 131, and three single channel inputs 127–129. The common input 130, common output 131, and each of the single channel inputs 127–129 are, as in the embodiments of FIGS. 4 and 10, preferably in the form of fiber optic connectors such as FC connectors to which connectors attached to the respective signal lines, receivers, or other components for supplying or receiving the separate channels can easily be mated. In addition, as in the embodiment of FIG. 4, each of the Mach-Zehnder interferometers 118–120 in the example illustrated in FIG. 11 is arranged to add a single channel, although it is also possible to arrange the Bragg gratings in an individual interferometer to add a group of adjacent closely-spaced channels for use as combiners or splitters in a modified cascade arrangement. Those skilled in the art will of course appreciate that the four channel uni-directional multiplexer of FIG. 11 could also be arranged to include four Mach-Zehnder interferometer units, in a manner similar to the example shown in FIG. 5.

Figure 12:
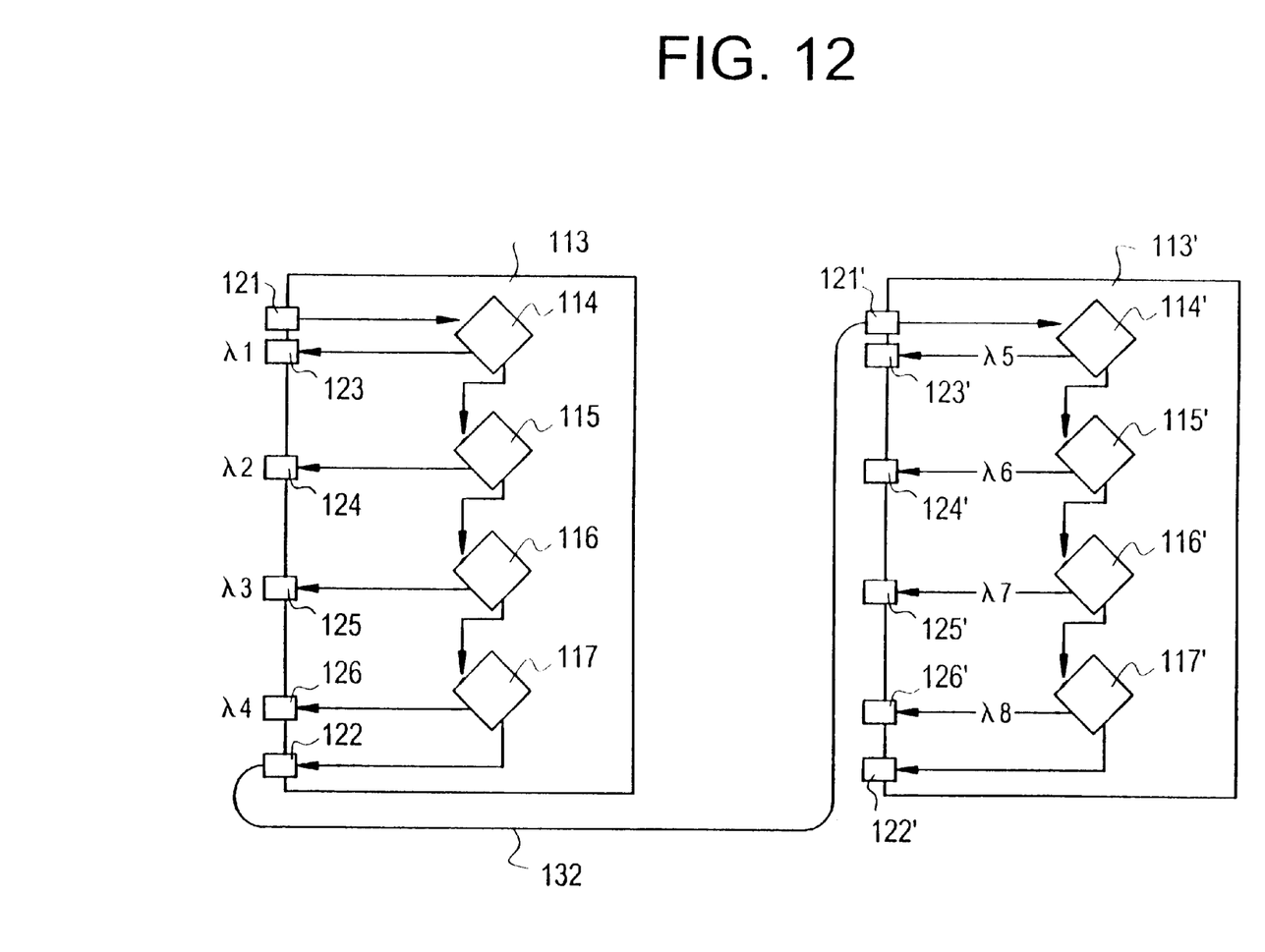
FIG. 12 is a schematic diagram showing the manner in which two four channel assemblies may be connected together to a form an eight channel assembly in accordance with the principles of the preferred embodiment.

As with the bi-directional connector arrangements, the bi-directional nature of the illustrated uni-directional components permits them to be connected together to increase the number of channels. For example, two of the demultiplexers 113 shown in FIG. 10, the second of which is designated by primed reference numerals but is identical to the first, can be connected together by adding a patchcord 132 between the common output 122 of the first demultiplexer 113 and the common input 121' of the second demultiplexer 113' to form an eight channel demultiplexer arrangement having eight different channel outputs $\lambda1$–$\lambda8$, as is shown in FIG. 12. Similarly, although not illustrated, two multiplexers, one of which includes a common input (and therefore an additional interferometer), may be connected together to form an eight channel multiplexer.

Figure 13:
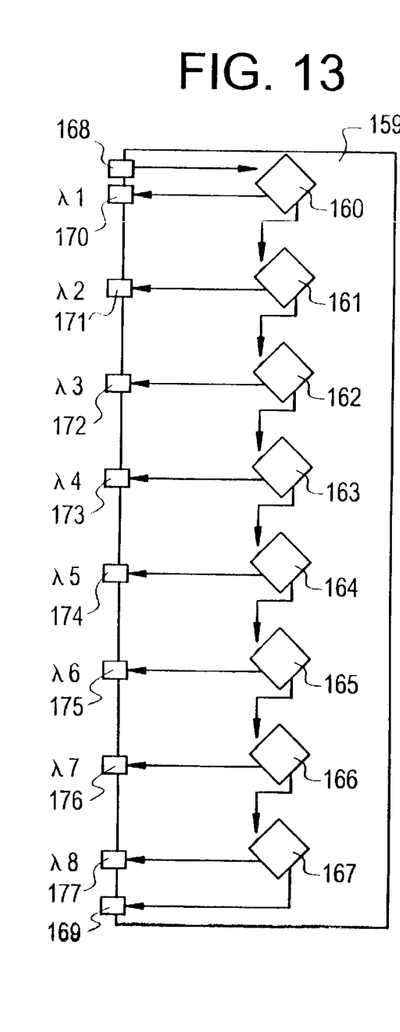
FIG. 13 is a schematic diagram of a unitary eight channel assembly constructed according to the principles of the preferred embodiment.

Alternatively, two four channel demultiplexers or multiplexers can be combined to form a single eight channel component, such as the eight channel demultiplexer shown in FIG. 13, which includes eight Mach-Zehnder units, numbered 160–167, but in the case of an eight channel multiplexer (not shown), it is also possible to omit individual Mach-Zehnder units in a manner similar to that shown in FIGS. 4, 7, and 11. In addition to the Mach-Zehnder units 160–167, FIGS. 12 and 13 show respective uni-directional common connectors 168 and 169, and uni-directional output connectors 170–177.

In addition, the above-described bi-directional and uni-directional components can be used not only in purely cascaded fashion to form a new DWDM system, but also in parallel by adding combiners as an upgrade to existing non-DWDM systems, and in particular to upgrade an NWDM arrangement to a DWDM system having an increased number of channels. This is especially convenient in the case of an NWDM upgrade, since channels can be added by using an existing NWDM component as a combiner or distributor for the respective common outputs and inputs of uni-directional multiplexers and demultiplexers of the type described above.

Figure 15:
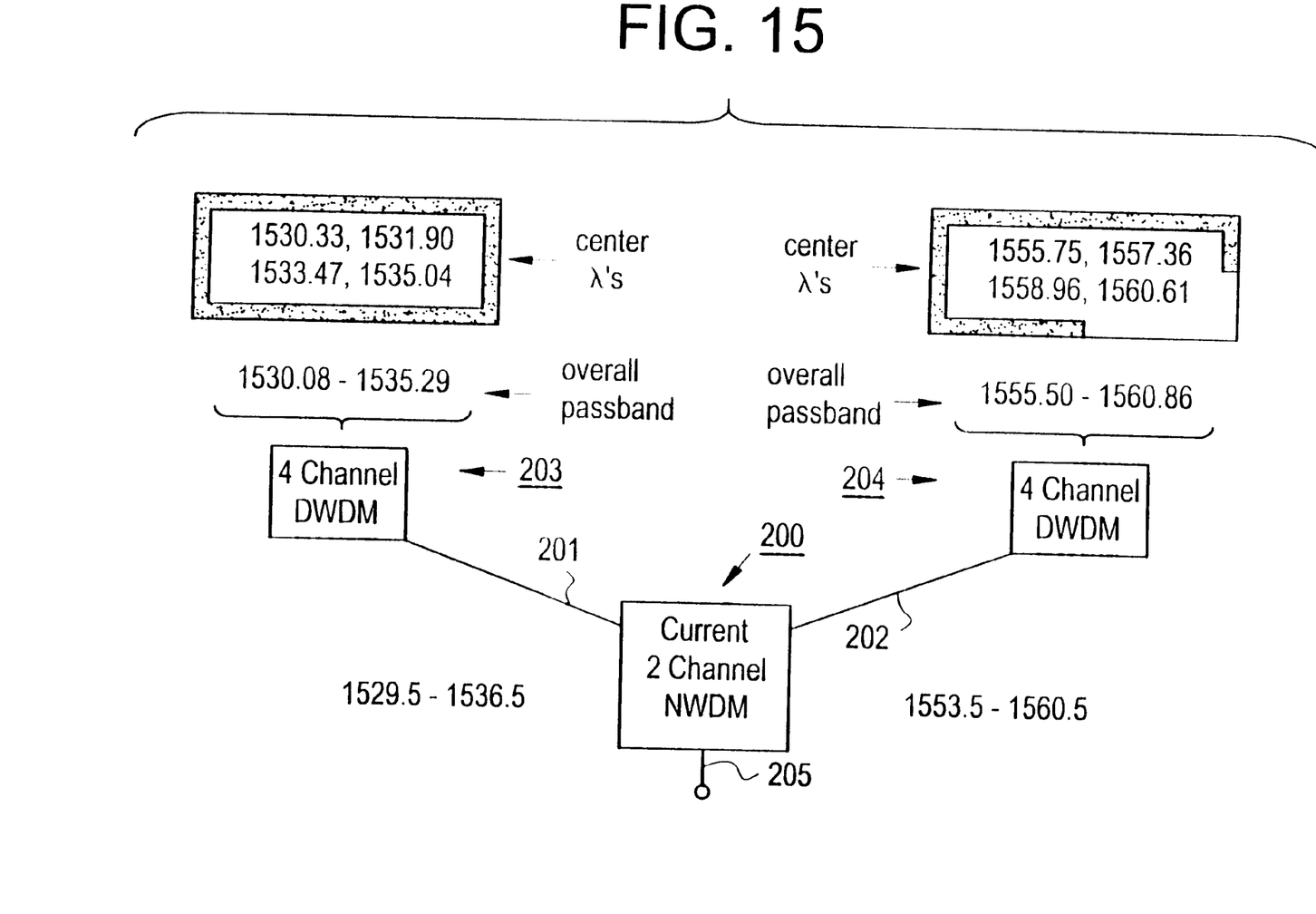
FIG. 15 is a schematic diagram illustrating the manner in which the multiplexer and demultiplexer of FIGS. 10 and 11 may be added to a conventional narrowband component in order to upgrade a two channel narrowband system to a seven channel DWDM system.

In the arrangement shown in FIG. 15, for example, a conventional NWDM assembly 200 having two ports 201 and 202 for inputting two channels in the case of a multiplexer, or for outputting two channels in the case of a demultiplexer, the two channels having respective passbands of 1529.5–1536.5 nm and 1553.5–1560.5 nm, may be converted into a seven channel system by connecting a respective four channel uni-directional DWDM multiplexer or DWDM demultiplexer 203,204 to each of the ports 201 and 202, the DWDM multiplexer or demultiplexer corresponding to the uni-directional components illustrated in FIGS. 10 or 11, with channel wavelength ranges of 1530.08 nm to 1535.29 nm for the first component and 1555.50 to 1560.86 nm for the second component. Of the four specific DWDM channels illustrated in FIG. 15, only the one centered at 1560.61 is not illustrated as being used because it is not within the passband of the NWDM component 200, although it is possible to shift this wavelength, and additional wavelengths, to fit within the passband and thereby increase the number of channels which can be supplied to and received from fiber optic transmission line 205. Because the components are arranged in parallel, the insertion losses are less than would be the case for a purely serial configuration, with typical insertion losses of 1.6 and 1.9 dB for the respective multiplexers and demultiplexers (the multiplexers have one less interferometer), and 2.0 dB or lower for the narrowband multiplexer/demultiplexer components, for a total insertion loss of 7.5 dB or lower.

Figure 16:
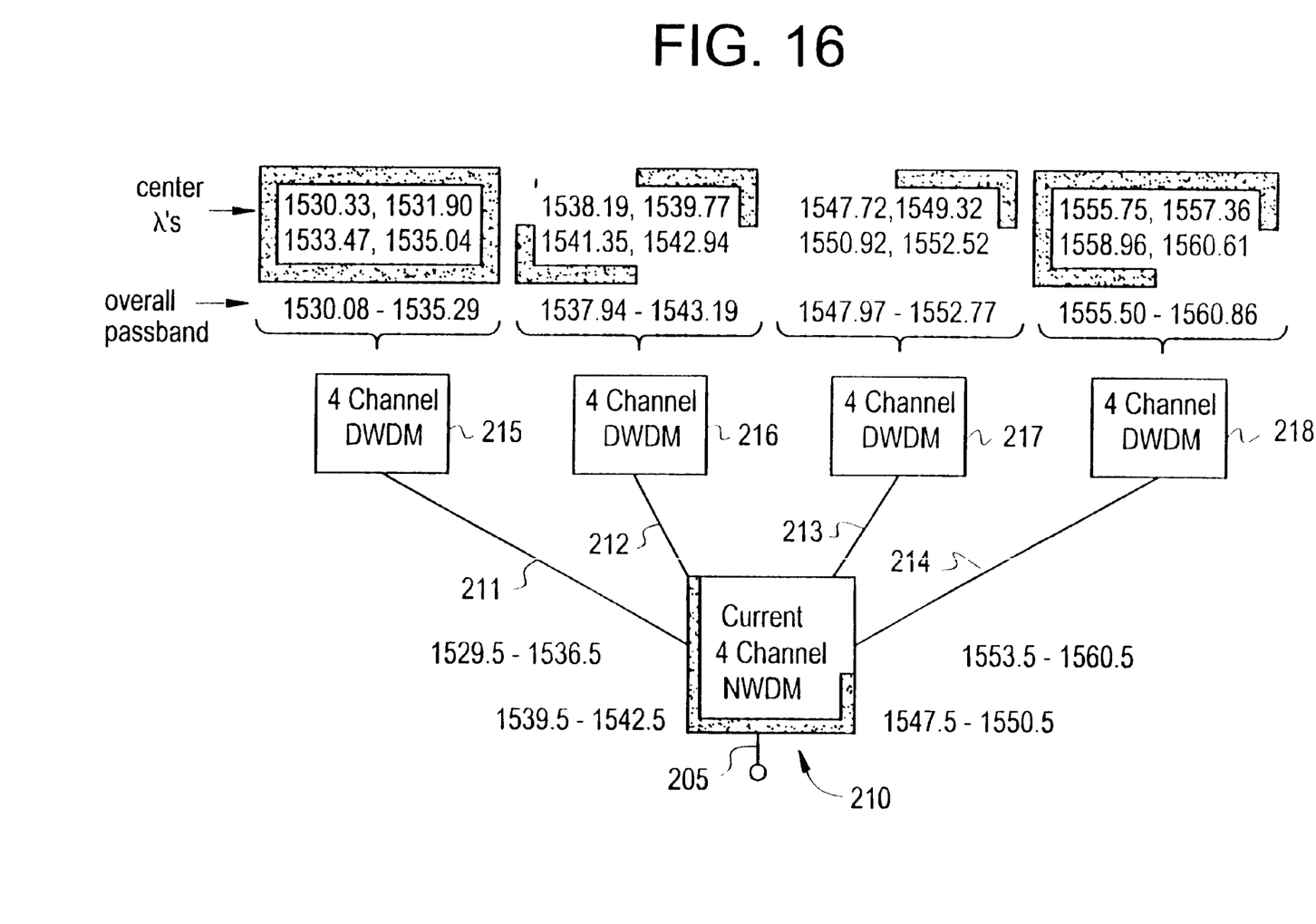
FIG. 16 is a schematic diagram of an upgrade arrangement similar to that of FIG. 15, but which permits upgrading of a four channel NWDM system.

Similarly, uni-directional components of the type illustrated in FIGS. 10 and 11 can also be used to upgrade an existing four channel NWDM component to a 10 channel DWDM component, as shown in FIG. 16, by adding four channel uni-directional DWDM components to an existing NWDM component 210 having ports 211–214 arranged to receive or transmit respective channels of 1529.5–1536.5 nm, 1539.5–1542.5 nm, 1553.5–1560.5 nm, and 1547.5–1550.5 nm, the respective four channel components 215–218 being arranged to transmit or receive respective DWDM channels of from 1520.08–1535.29 nm, 1537.94–1543.19 nm, 1547.97–1552.77 nm, and 1555.50 to 1560.86, with the centers of the channels being listed within the respective blocks situated above the functional blocks representing components 215–218, and the overall channel width from the shortest wavelength to the longest being listed below the blocks. Even excluding those wavelengths which fall outside the bandwidth of the conventional NWDM channels, or too close to the edges of the channels, this arrangement can accommodate 10 channels, with the only modifications to the existing infrastructure being the addition of the four unidirectional DWDM components.

It is noted that due to limited channel widths, the narrowband component can only accommodate ten DWDM channels in the illustrated configuration, leaving at least six input and output connectors and their corresponding interferometers unused. Such waste can be tolerated where the principal objective is to upgrade an existing system with maximal utilization of existing components, although it is also possible to use combiners having increased channel passbands to provide the effect of parallelism offered by the system of FIG. 15, which reduces overall insertion losses.

Figure 14:
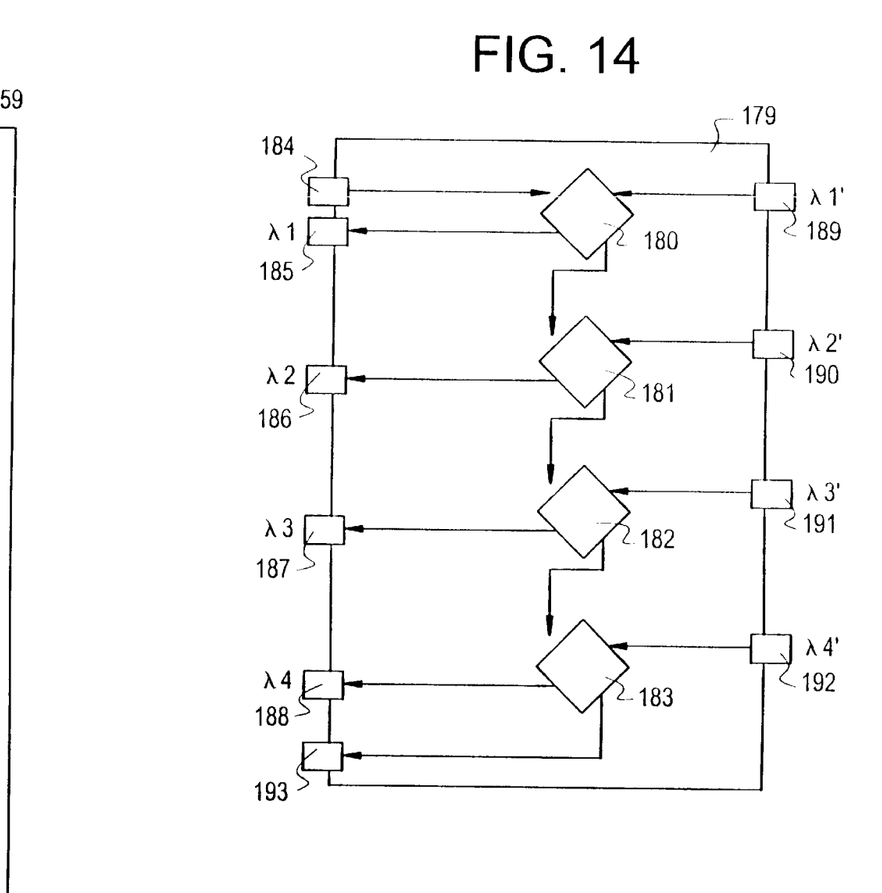
FIG. 14 is a schematic diagram of an add/drop assembly constructed in accordance with the principles of the preferred embodiment.

Finally, in addition to bi-directional and uni-directional multiplexer and/or demultiplexer components, the principles of the invention can be applied to add/drop components of various configurations, represented by (but not limited to) the one shown in FIG. 14. The add/drop components may be constructed in a manner similar to the above-described demultiplexer assemblies, except that the third port of each of the individual Mach-Zehnder interferometer units (port 8 in FIG. 1) is used to add a signal having the same frequency as the signal removed through the second port (port 7). The resulting add/drop component 179 includes four individual Mach-Zehnder interferometers 180–183, a common input connector 184 through which signals $\lambda 1 - \lambda 4$ are input, output connectors 185–188 for $\lambda 1 - \lambda 4$, input connectors 189–192 for signals $\lambda 1' - \lambda 4'$, which must be at wavelengths close to or identical to those of signals $\lambda 1 - \lambda 4$ if the Mach-Zehnder interferometer shown in FIG. 1 is used, since both the added and dropped wavelength must be within the band of wavelengths reflected by the Bragg gratings. In the illustrated add/drop arrangement, signals $\lambda 1' - \lambda 4'$ are output through connector 193, which can be connected by a suitable patch cord to further add/drop assemblies, fiber optic cables, or other components as desired. As with the multiplexer/demultiplexer arrangements of the embodiments shown in FIGS. 1–13, the individual interferometers can be connected to each other and to the input/output connectors by fusion splices, additional gratings, filters, or interferometers may be included to increase channel isolation and directivity, and of course the number of interferometers and corresponding input and output connectors may be arbitrarily increased or decreased depending on the number of channels to be added or dropped.

Having thus described various preferred embodiments of the invention, those skilled in the art will appreciate that variations and modifications of the preferred embodiment may be made without departing from the scope of the invention. For example, as discussed above, the number of channels provided for in the basic components and in the add-on components may be freely varied depending on system requirements, as may be the wavelengths of the channels carried, and any of the illustrated fusion splices or connectors may be replaced by other types of connections. Furthermore, those skilled in the art will appreciate that additional filters or interferometric devices may be added to any devices utilizing the principles of the invention to increase isolation, increase directivity, and/or reduce losses, and that the multiplexers, demultiplexers, multiplexer/demultiplexers, and/or add/drop components of the invention may be separately housed as mentioned above, housed together, or integrated with other optical components.

It is accordingly intended that the invention not be limited by the above description or accompanying drawings, but that it be defined solely in accordance with the appended claims.

I claim:

1. A bi-directional multiplexer/demultiplexer component, comprising:

a plurality of Mach-Zehnder interferometer units, each unit comprising a pair of 50/50 fiber optic couplers connected by a pair of Bragg gratings and three functional ports including two multi-channel input/output ports, and one single channel input/output port, said Bragg gratings being tuned to a wavelength of the single channel input/output port;

means for connecting a plurality of transmitters respectively to some of said single channel input/output ports and means for connecting a plurality of receivers respectively to a remainder of said single channel input/output ports;

means for connecting input/output ports of adjacent said interferometer units in a cascade configuration; and a first common input/output port on a first of said cascaded interferometer units and a second common input/output port on a last of said cascaded interferometer units, wherein said common input/output ports include fiber optic connectors, and wherein said second common input/output port provides a means for connecting the component to an add-on component arranged to provide multiplexing and demultiplexing of additional channels.

2. A component as claimed in claim 1, wherein said means for connecting input/output ports of adjacent cascaded interferometer units consists of fusion splices.

3. A component as claimed in claim 1, wherein a number of said input/output ports connected to said transmitters is one less than a number of said input/output ports connected to said receivers.

4. A component as claimed in claim 3, wherein said second input/output port is arranged to be connected either to said add-on component or to an additional transmitter.

5. A component as claimed in claim 4, wherein said add-on component includes an additional plurality of said Mach-Zehnder interferometer units and means for connecting a plurality of transmitters respectively to some of said additional Mach-Zehnder interferometer units and means for connecting a plurality of receivers respectively to a remainder of said plurality of additional Mach-Zehnder interferometer units, and wherein a number of said transmitter connecting means is one greater than a number of said receiver connecting means.

6. A component as claimed in claim 1, wherein said transmitter connecting means and said receiver connecting means comprise fiber optic connectors.

7. A component as claimed in claim 1, further comprising a plurality of Bragg gratings connected between said receiver connecting means and said interferometer units connected to said receiver connecting means.

8. A component as claimed in claim 7, wherein said Bragg gratings are connected to said receiver connecting means and to said interferometer units by fusion splices.

9. A component as claimed in claim 1, comprising four of said receiver connecting means and three of said transmitter connecting means to form an eight channel bi-directional multiplexer/demultiplexer.

10. A component as claimed in claim 1, comprising four of said receiver connecting means and three of said transmitter connecting means to form an eight channel bi-directional multiplexer/demultiplexer.

11. A component as claimed in claim 1, comprising two of said receiver connecting means and three of said transmitter connecting means to form a four channel add-on unit.

12. A component as claimed in claim 1, comprising two of said receiver connecting means and three of said transmitter connecting means to form a four channel add-on unit.

13. A cascaded fiber optic multiplexer, comprising:
  a plurality of Mach-Zehnder interferometer units, each unit comprising a pair of 50/50 fiber optic couplers connected by a pair of Bragg gratings and three functional ports including two multi-channel input/output ports, and one single channel input port, said Bragg gratings being tuned to a wavelength of the single channel input port;
  means for connecting a plurality of transmitters respectively to said single channel input ports;
  means for connecting input/output ports of adjacent said interferometer units in a cascade configuration; and
  a first common input/output port on a first of said cascaded interferometer units and a second common input/output port on a last of said cascaded interferometer units,
  wherein said common input/output ports include fiber optic connectors, and
  wherein said second common input/output port provides a means for connecting the component to an add-on component arranged to provide multiplexing of additional channels.

14. A multiplexer as claimed in claim 13, wherein said means for connecting input/output ports of adjacent cascaded interferometer units consists of fusion splices.

15. A multiplexer as claimed in claim 13, wherein a number of said input/output ports connected to said transmitters is one less than a number of said channels.

16. A multiplexer as claimed in claim 15, wherein said second input/output port is arranged to be connected either to said add-on multiplexer or to an additional transmitter.

17. A multiplexer as claimed in claim 16, wherein said add-on multiplexer includes an additional plurality of said Mach-Zehnder interferometer units and means for connecting a plurality of transmitters respectively to said additional Mach-Zehnder interferometer units, and wherein a number of said transmitter connecting means is one greater than said number of said additional Mach-Zehnder interferometer units.

18. A multiplexer as claimed in claim 17, wherein said transmitter connecting means comprise fiber optic connectors.

19. A cascaded fiber optic demultiplexer, comprising:
  a plurality of Mach-Zehnder interferometer units, each unit comprising a pair of 50/50 fiber optic couplers connected by a pair of Bragg gratings and three functional ports including two multi-channel input/output ports, and one single channel output port, said Bragg gratings being tuned to a wavelength of the single channel input port;
  means for connecting a plurality of receivers respectively to said single channel output ports;
  means for connecting input/output ports of adjacent said interferometer units in a cascade configuration; and
  a first common input/output port on a first of said cascaded interferometer units and a second common input/output port on a last of said cascaded interferometer units,
  wherein said common input/output ports include fiber optic connectors, and
  wherein said second common input/output port provides a means for connecting the demultiplexer to an add-on demultiplexer arranged to provide demultiplexing of additional channels.

20. A demultiplexer as claimed in claim 19, wherein said means for connecting input/output ports of adjacent cascaded interferometer units consists of fusion splices.

21. A demultiplexer as claimed in claim 19, wherein said add-on demultiplexer includes an additional plurality of said Mach-Zehnder interferometer units and means for connecting a plurality of receivers respectively to said additional Mach-Zehnder interferometer units.

22. A demultiplexer as claimed in claim 19, wherein said receiver connecting means comprise fiber optic connectors.

23. A demultiplexer as claimed in claim 19, further comprising a plurality of Bragg gratings connected between said receiver connecting means and said interferometer units connected to said receiver connecting means.

24. A demultiplexer as claimed in claim 23, wherein said Bragg gratings are connected to said receiver connecting means and to said interferometer units by fusion splices.

25. A cascaded fiber optic add/drop component, comprising:
  a plurality of Mach-Zehnder interferometer units, each unit comprising a pair of 50/50 fiber optic couplers connected by a pair of Bragg gratings and four functional ports including a multi-channel input port, a multichannel output port, a single channel input port, and a single channel output port, said Bragg gratings being tuned to wavelengths of the single channel input and output ports;
  means for connecting a plurality of receivers respectively to each of said single channel output ports;
  means for connecting a plurality of transmitters respectively to each of said single channel input ports;

means for connecting input/output ports of adjacent said interferometer units in a cascade configuration; and a common input port on a first of said cascaded interferometer units and a common output port on a last of said cascaded interferometer units, wherein said common input and output ports include fiber optic connectors.

26. A multiplexer as claimed in claim 25, wherein said means for connecting the multichannel input and output ports of adjacent cascaded interferometer units consists of fusion splices.

27. A multiplexer as claimed in claim 25, wherein said transmitter and receiver connecting means comprise fiber optic connectors.

28. An arrangement for adding channels to an existing narrowband multiplexer and/or demultiplexer component, comprising:

at least two uni-directional cascaded DWDM components, each having a plurality of DWDM channels; and means for connecting the at least two DWDM components in parallel, said means connecting ports of an existing NWDM component to common connectors on the DWDM components so that the NWDM component serves as a combiner for the DWDM components.

29. An arrangement as claimed in claim 28, wherein said DWDM components are four channel DWDM multiplexers or demultiplexers.

30. An arrangement as claimed in claim 29, wherein said NWDM component is a two channel NWDM component, a number of said four channel DWDM multiplexers or demultiplexers is two, and a number of said DWDM channels is at least two.

* * * * *